(12) United States Patent
Bruguera (10) Patent No.: US 10,152,303 B2
(45) Date of Patent: Dec. 11, 2018

(54) PARTIAL SQUARE ROOT CALCULATION

(71) Applicant: ARM Limited, Cambridge (GB)

(72) Inventor: Javier Diaz Bruguera, Austin, TX (US)

(73) Assignee: ARM Limited, Cambridge (GB)

( * ) Notice: Subject to any disclaimer, the term of this patent is extended or adjusted under 35 U.S.C. 154(b) by 41 days.

(21) Appl. No.: 15/376,947

(22) Filed: Dec. 13, 2016

(65) Prior Publication Data

US 2018/0165064 A1    Jun. 14, 2018

(51) Int. Cl.
*G06F 7/552* (2006.01)
*G06F 7/523* (2006.01)

(52) U.S. Cl.
CPC .......... *G06F 7/5235* (2013.01); *G06F 7/5525* (2013.01)

(58) Field of Classification Search
None
See application file for complete search history.

(56) References Cited

U.S. PATENT DOCUMENTS

| | | | |
|---|---|---|---|
| 6,847,985 B1* | 1/2005 | Gupta | G06F 7/483 708/500 |
| 2003/0154228 A1* | 8/2003 | Kurd | G06F 7/535 708/605 |
| 2014/0052767 A1* | 2/2014 | Diaz Brugueira | G06F 7/483 708/500 |
| 2018/0165064 A1* | 6/2018 | Bruguera | G06F 7/5525 |

* cited by examiner

*Primary Examiner* — David H Malzahn
(74) *Attorney, Agent, or Firm* — Nixon & Vanderhye P.C.

(57) ABSTRACT

A data processing apparatus is provided, to calculate an at least partial square root of a floating point number having an exponent and significand. Recurrence circuitry performs one or more iterations of an iterative square root operation, each of the one or more iterations receiving an input at least partial square root and an input remainder to produce the at least partial square root and a remainder of performing the iterative square root operation. The recurrence circuitry provides the at least partial square root and the remainder as the input at least partial square root and the input remainder for a subsequent iteration of the iterative square root operation. The recurrence circuitry includes initialization circuitry to provide the at least partial square root and the remainder after at least an initial iteration of the one or more iterations. The initialization produces the remainder by performing a selection of one of a plurality of predetermined values in dependence on whether the exponent is odd or even.

16 Claims, 9 Drawing Sheets

PARTIAL SQUARE ROOT CALCULATION

TECHNICAL FIELD

The present disclosure relates to data processing. More particularly, it relates to partial square root calculation.

DESCRIPTION

Digit-recurrence is a process in which an iterative algorithm for performing a computation. Each iteration, a new digit of the output is produced. Each digit is represented by a number of bits. In a radix r implementation, a digit is $\log_2(r)$ bits. For example, in an implementation with a radix of 4, each digit represents two bits and so at each iteration, two bits would be output. The number of iterations required to produce the end result is equal to the number of bits of the result divided by the number of bits produced at each iteration. As the radix increases, a small number of iterations is required in order to produce the same output, but the circuitry becomes more complex.

Digit-recurrence may be used in the calculation of square roots. At each iteration, a partial (square) root is produced. Furthermore, since the square root could be an irrational number or since the exact value of the square root may not be exact, given the desired level of accuracy, the final output of the digit-recurrence circuitry could also be described as a partial (square) root. Calculating a square root of partial square root in this manner can be time consuming. Accordingly, it is desirable to speed up the algorithm, for example, by reducing the number of iterations required, without significantly increasing the complexity of the circuitry, which would increase power consumption.

SUMMARY

Viewed from a first example configuration, there is provided a data processing apparatus to calculate an at least partial square root of a floating point number comprising an exponent and significand, said data processing apparatus comprising: recurrence circuitry to perform one or more iterations of an iterative square root operation, each of said one or more iterations receiving an input at least partial square root and an input remainder to produce said at least partial square root and a remainder of performing said iterative square root operation, wherein said recurrence circuitry is configured to provide said at least partial square root and said remainder as said input at least partial square root and said input remainder for a subsequent iteration of said iterative square root operation; said recurrence circuitry comprises initialisation circuitry to provide said at least partial square root and said remainder after at least an initial iteration of said one or more iterations; and said initialisation circuitry is configured to produce said remainder by performing a selection of one of a plurality of predetermined values in dependence on whether said exponent is odd or even.

Viewed from a second example configuration, there is provided a data processing means for calculating an at least partial square root of a floating point number comprising an exponent and significand, said data processing means comprising: recurrence means for performing one or more iterations of an iterative square root operation, each of said one or more iterations receiving an input at least partial square root and an input remainder to produce said at least partial square root and a remainder of performing said iterative square root operation, wherein said recurrence means is for providing said at least partial square root and said remainder as said input at least partial square root and said input remainder for a subsequent iteration of said iterative square root operation; said recurrence means comprises initialisation means for providing said at least partial square root and said remainder after at least an initial iteration of said one or more iterations; and said initialisation means is for producing said remainder by performing a selection of one of a plurality of predetermined values in dependence on whether said exponent is odd or even.

Viewed from a third example configuration A data processing method of calculating an at least partial square root of a floating point number comprising an exponent and significand, said data processing method comprising: performing one or more iterations of an iterative square root operation, each of said one or more iterations receiving an input at least partial square root and an input remainder to produce said at least partial square root and a remainder of performing said iterative square root operation, wherein said at least partial square root and said remainder are passed as said input at least partial square root and said input remainder for a subsequent iteration of said iterative square root operation; said step of performing one or more iterations comprises an initialisation step of providing said at least partial square root and said remainder after at least an initial iteration of said one or more iterations; and said initialisation step produces said remainder by performing a selection of one of a plurality of predetermined values in dependence on whether said exponent is odd or even.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus to calculate an at least partial square root of a floating point number comprising an exponent and significand, said data processing apparatus comprising: recurrence circuitry to perform one or more iterations of an iterative square root operation, each of said one or more iterations receiving an input at least partial square root and an input remainder to produce said at least partial square root and a remainder of performing said iterative square root operation, wherein said recurrence circuitry is configured to provide said at least partial square root and said remainder as said input at least partial square root and said input remainder for a subsequent iteration of said iterative square root operation; said recurrence circuitry comprises initialisation circuitry to provide said at least partial square root and said remainder after at least an initial iteration of said one or more iterations; and said initialisation circuitry is configured to produce said remainder by performing a selection of one of a plurality of predetermined values in dependence on whether said exponent is odd or even.

The initialisation circuitry takes advantage of the fact that the floating point number for which an at least partial square root is to be determined will be in a particular format. For example, the floating point number could be in a normalised format. Since the input format is limited, the number of possible values of the output digit of the first iteration is also limited. Similarly, the number of possible values of the remainder after a first iteration is also limited. Accordingly, rather than perform an initial (e.g. first) iteration, it is possible to determine the output remainder by performing a selection on a plurality of possible output values based on whether the exponent is odd or even. This selection process can be achieved efficiently as compared to performing the initial iteration, and consequently it is possible to reduce the effective number of iterations by one, whilst still determining the at least partial square root correctly.

In some embodiments, said remainder is represented using redundant-representation comprising a positive word and a negative word; said plurality of predetermined values are a plurality of possible predetermined values of said negative word. Redundant-representation is a technique in which a value is represented as a pair of words, for example a positive word and a negative word. In this example, the overall value can be determined by subtracting the negative word from the positive word. Redundant-representation is an efficient way of representing a value for some circuits. In such embodiments, the plurality of possible predetermined values could relate to possible predetermined values of one of the words (e.g. the negative word).

In some embodiments, said selection is additionally in dependence on a value of a bit of said significand.

In some embodiments, said initialisation circuitry is configured to produce said positive word by performing a further selection of one of a plurality of predetermined values of said positive word in dependence on a value of said bit of said significand. In these embodiments, a pair of selections takes place. A first selection takes place in respect of the negative word of the remainder as previously discussed, and a second selection takes place in respect of the positive word of the remainder. The pair of selections therefore leads to an overall value of the remainder.

In some embodiments, said further selection is additionally in dependence on whether said exponent is odd or even.

In some embodiments, said initialisation circuitry is configured to produce said positive word by performing a concatenation on bits '11', followed by bits of said floating point number, followed by bits '00'. It is also possible to determine the positive word of the remainder by performing a concatenation on certain bits. In particular, the positive word can be derived by performing a concatenation on two bits '11', followed by bits of the input floating point number, followed by a further two bits '00'. The bits of the input floating point number could, for example, be bits of the significand of the normalised input floating point number (therefore excluding the implied one before the decimal point). Since this determination is made by amalgamating bits, it can in certain cases proceed efficiently.

In some embodiments, said initialisation circuitry is configured to produce said at least partial square root in dependence on whether said exponent is odd or even, and in dependence on said value of said bit of said significand.

In some embodiments, said at least partial square root is represented using redundant representation comprising a positive word and a negative word; said positive word is '01.00'; and in response to said exponent being odd, said negative word comprises bits '00.0' followed by a negation of said bit of said significand; and in response to said exponent being even, said negative word comprises bits '00', followed by a decimal point, followed by a negation of said bit of said significand, followed by said bit of said significand. In such embodiments, the output digit is represented using redundant-representation as previously discussed. The positive word is fixed as being 01.00. The negative word depends on both the exponent and the input digit. In this way, there are four possible values of the output digit.

In some embodiments, there is provided shifting circuitry to right shift said significand a number of times and to increment said exponent by said number of times, wherein in response to said exponent being even, said number of times is two; and in response to said exponent being odd, said number of times is one. In some of these embodiments, the shifting circuitry may also provide said bit of said significand to said initialisation circuitry. In other embodiments, said bit could be determined by the initialisation circuitry itself. The shifting circuitry firstly right shifts the input once in order that the input is in a format suitable for the initialisation circuitry to operate. In particular, by performing a right shift on the input, it is possible to reduce the number of possible outcomes for a first iteration of the digit-recurrence algorithm. Secondly, the shifting circuitry performs a further right shift on the input if the exponent was initially even. This is to avoid a situation whereby after the first right shift, the exponent (that was initially even) becomes odd. Performing a square root causes the exponent to be halved. However, it will be appreciated that a floating point number cannot represent a fractional exponent. Consequently, it is necessary for the exponent to be an even number so that when the exponent is halved, the result will still be an integer. Consequently, the shifting circuitry performs either one or two right shifts depending on whether the exponent is odd or even to begin with.

In some embodiments said recurrence circuitry provides said at least partial square root by passing said at least partial square root to said recurrence circuitry. In these embodiments, the partial square root that is the result of an iteration of the algorithm is passed in its entirety as an input back to the recurrence circuitry as an input for a further iteration. In other embodiments, the at least partial square root of one iteration is provided to the recurrence circuitry for a subsequent iteration by storing the at least partial square root (or part of it) in a local memory. Passing the output of one iteration as an input for a subsequent iteration can obviate the need for additional storage to be provided in the recurrence circuitry.

In some embodiments, in each of said one or more iterations, said at least partial square root increases in length by one digit. The algorithm may proceed until a desired accuracy of the at least partial square root is obtained. When this point is reached, the output of the at least partial square root from the recurrence circuitry can be provided as part of the desired answer. In some embodiments, the remainder may also be provided or may be provided for rounding the at least partial square root prior to it being provided as the desired answer.

In some embodiments said at least partial square root has a radix of 4. A radix of four means that each digit is represented by a pair of bits. Accordingly, each digit can have one of four possible values. In other embodiments, said at least partial square root has a radix of 2. In these embodiments, each digit is made up of a single bit. Each bit has the ability to represent two different values (typically 0 or 1).

In some embodiments, said bit of said significand is a first bit of said significand. The first bit of the significand represents the first bit after the decimal point when the floating point number is in normalised form.

Particular embodiments will now be described with reference to the figures.

Figure 1:
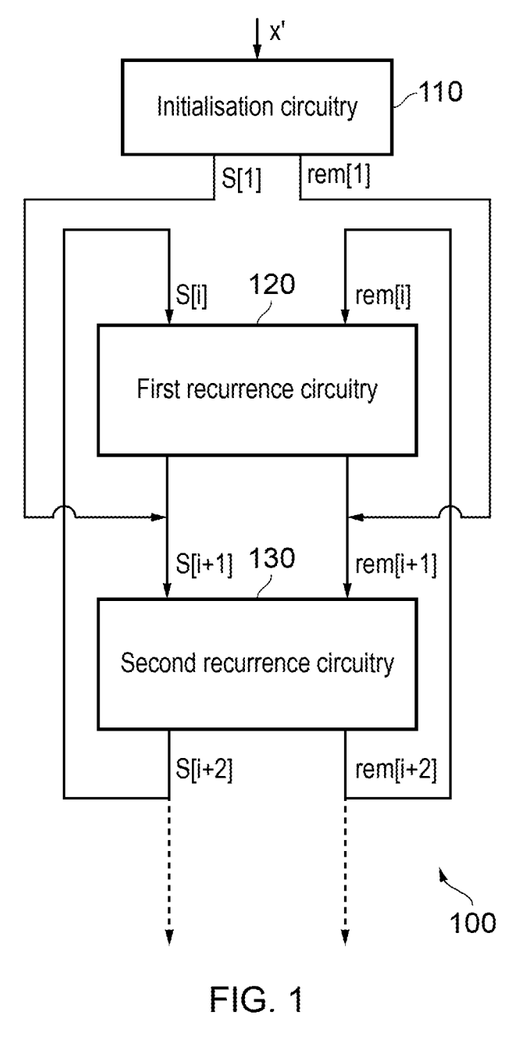
FIG. 1 illustrates a data processing apparatus in accordance with one embodiment.

FIG. 1 illustrates a data processing apparatus 100 for performing a square root operation on an input floating point number $x' (=1.x_0x_1x_2 \ldots x_p)$ using a digit-recurrence algorithm. The apparatus comprises initialisation circuitry 110, which receives the input floating point number $x'$ and outputs an at least partial square root and a remainder (S[1] and rem[1] respectively) to second recurrence circuitry 130. The second recurrence circuitry performs an iteration of the square root operation, and again outputs a partial root and remainder of performing the operation (S[i+2] and rem [i+2] respectively). These outputs are provided to first recurrence circuitry 120. Again, the first recurrence circuitry 120 performs an iteration of the square root operation, outputting partial square root and remainder values. These values are passed back to the second recurrence circuitry 130. In other words, the first recurrence circuitry 120 and the second recurrence circuitry 130 each perform one iteration of the square root operation. Collectively, they perform two operations in a single cycle. The output of the second recurrence circuitry 130 is then passed back to the first recurrence circuitry 120 as an input for a further two iterations of the algorithm. The outputs of the second recurrence circuitry 130 may be output as a final partial root and final remainder when the desired level of accuracy is obtained. The final remainder could be provided together with the final root or could be used to perform rounding on the final root.

The initialisation circuitry 110 bypasses the first recurrence circuitry 120 for a first iteration of the iterative square root operation. However, rather than performing the first iteration of the iterative square root operation, the initialisation circuitry 110 is able to take advantage of the fact that the input floating point number $x'$ is of a particular format. Consequently, the possible values of the output partial square root S[1] and the remainder rem[1] are limited. For example, the possible inputs for the first iteration is a subset of possible inputs for other iterations of the square root algorithm. This observation makes it possible to determine the output values by selecting from a list of possible output values. In particular, the list of possible output values is a subset of possible output values for other iterations of the square root algorithm. This selection process will be shown in more detail with respect of FIGS. 4 to 6.

The square root algorithm used by the first recurrence circuitry 120 and the second recurrence circuitry 130 will be known to the skilled person and is described in, for example, Milos Ercegovac and Tomas Lang, Division and Square root, Digit-recurrence Algorithms and Implementations, Kluwer Academic Publishers, 1994, the contents of which are incorporated herein in their entirety. However, for convenience, a brief summary of the algorithm is given here.

The partial root after an iteration i−1 is $S[i]=\Sigma_{j=0}^{i} s_j \times r^{-j}$ Where value r corresponds with the radix (e.g. four), $s_j$ corresponds with the j'th digit of the partial root obtained so far ($s_0=1$ for a radix of four and $s_0=0$ for a radix of two). The digit $s_{i+1}$ is determined by the equation:

$$s_{i+1} = DET(r \times \overline{rem}[i], \overline{s[i]})$$

Again, the value r corresponds with the radix being used. The digit determination function DET (also referred to as SEL) takes as inputs an estimate of the remainder from the previous iteration and an estimate of the partial root determined via the previous iteration. The estimate of each of these values is taken by considering only a number of bits from the remainder and partial root of the previous iteration. For the estimate of the partial root, with a radix of four, five bits are used (including the first four fractional bits). This divides the range [0.5, 1] of S[i] into intervals of length $2^{-4}$, giving nine intervals between $[2^{-1}+p2^{-4}, 2^{-4}+(p+1)2^{-4}]$ for interval p (p=0, . . . , 8). Note that interval p=8 corresponds to value S[i]=1.

The digit determination function DET compares the 8-bit remainder estimate with four (in the case of a radix of four) comparison constants $m_k(p)$, k=2, 1, 0, −1, in such a way that the digit $s_{(i+1)}$=k if $\overline{rem}[i] \geq m_k(p)$ and $\overline{rem}[i] < m_{k+1}(p)$. Note that the determination constants depend on the interval p. The remainder estimate is 2's complement number.

The table below shows the determination constants for a radix of four.

| | Comparision constants | | | |
|---|---|---|---|---|
| interval | $m_2(i)$ | $m_1(i)$ | $m_0(i)$ | $m_{-1}(i)$ |
| p = 0 | $\frac{24}{16}$ | $\frac{8}{16}$ | $\frac{-8}{16}$ | $\frac{-23}{16}$ |
| p = 1 | $\frac{27}{16}$ | $\frac{8}{16}$ | $\frac{-8}{16}$ | $\frac{-27}{16}$ |
| p = 2 | $\frac{30}{16}$ | $\frac{8}{16}$ | $\frac{-8}{16}$ | $\frac{-30}{16}$ |
| p = 3 | $\frac{32}{16}$ | $\frac{12}{16}$ | $\frac{-12}{16}$ | $\frac{-32}{16}$ |
| p = 4 | $\frac{36}{16}$ | $\frac{12}{16}$ | $\frac{-12}{16}$ | $\frac{-36}{16}$ |
| p = 5 | $\frac{40}{16}$ | $\frac{16}{16}$ | $\frac{-12}{16}$ | $\frac{-40}{16}$ |
| p = 6 | $\frac{40}{16}$ | $\frac{16}{16}$ | $\frac{-16}{16}$ | $\frac{-40}{16}$ |
| p = 7 | $\frac{44}{16}$ | $\frac{16}{16}$ | $\frac{-16}{16}$ | $\frac{-44}{16}$ |
| p = 8 | $\frac{48}{16}$ | $\frac{16}{16}$ | $\frac{-16}{16}$ | $\frac{-48}{16}$ |
| | | | | $\left(\frac{-40}{16} \text{ for first iteration, } i = 0\right)^*$ |

*Note
that the value for the first iteration i = 0 is given here for completeness. In the present embodiment, the first iteration is not actually performed.

For example, given a partial root estimate $\hat{S}[i]=0.1100$ (in binary, or $$\frac{3}{4}$$

in decimal) and a remainder estimate of $\widehat{rem}[i]=0001.0101$ (in binary, or $$\frac{21}{16}$$

in decimal), the partial root interval is p=4, and the determination constants are those in row p=4 of the table, i.e.

$$m_2(4) = \frac{36}{16}, m_1(4) = \frac{12}{16}, m_0(4) = -\frac{12}{16}, m_{-1}(4) = -\frac{23}{16}.$$

The comparison of the remainder estimate with the comparison constants shows that $\widehat{rem}[i] \geq m_1(4)$ and $\widehat{rem}[i] < m_2(4)$. Therefore, $s_{i+1}=1$. Note that for a radix of four the possible values of each digit are −2, −1, 0, 1, and 2.

With the determination function now explained, the equation for determining the partial root at an iteration i+1 is given by the equation:

$$S[i+1]=S[i]+s_{i+1} \times r^{-(i+1)}$$

Again, where r is the radix (e.g. four). Finally, the equation for determining the remainder at an iteration i+1 is given by the equation:

$$\text{rem}[i+1]=r \times \text{rem}[i]-s_{i+1} \times (2 \times S[i]+s_{i+1} \times r^{-(i+1)})$$

Once again, the value r corresponds with the radix. For a radix of four, the initial remainder value rem[0]=x−1, where x is the significand of the input floating point number after having been shifted. For a radix of two, the initial remainder value rem[0]=x. The determination of the value x will be discussed with reference to FIG. 3.

Figure 2:
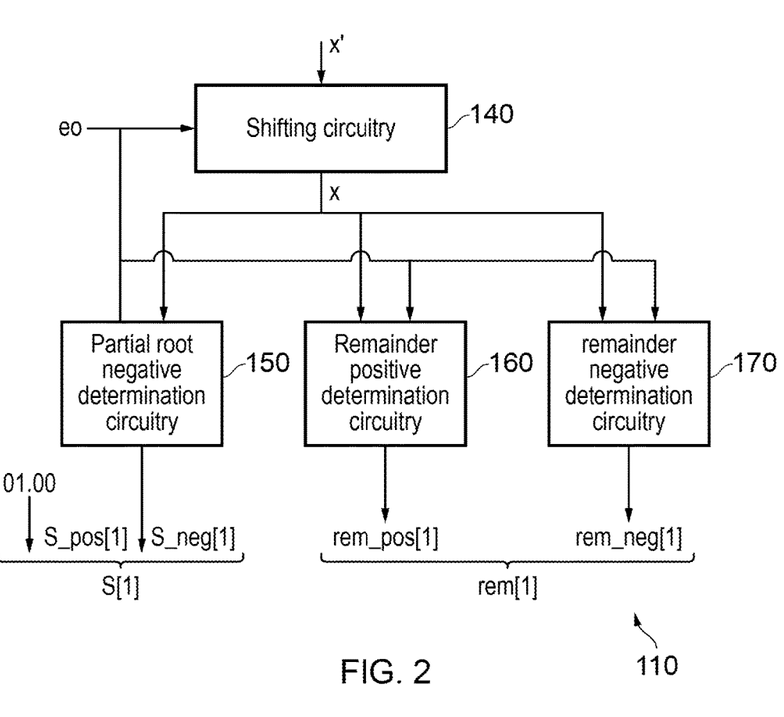
FIG. 2 illustrates an example of initialisation circuitry for determining a partial square root after a first iteration in accordance with one embodiment.

FIG. 2 shows an example embodiment of the initialisation circuitry 110. The initialisation circuitry includes shifting circuitry 140 that receives the input floating point number in normalised format x'. In addition, the shifting circuitry 140 receives an input $e_0$ that indicates whether or not the exponent of the floating point number x' is even or not. In particular, in this embodiment, the value $e_0$ is equal to 1 if the exponent is an odd number and 0 otherwise. It will be appreciated that other representations could also be used. Furthermore, the shifting circuitry 140 could determine $e_0$.

The shifting circuitry 140 performs an initial shifting process to the significand of the input floating point number x', to put the significand into an appropriate format. The shifting circuitry 140 will be discussed in more detail with respect to FIG. 3. The output x of the shifting circuitry 140 comprises a shifted significand, and this is passed to a partial root negative determination circuitry 150, a remainder positive determination circuitry 160, and a remainder negative determination circuitry 170. Note that in this embodiment, a redundant representation is used for the partial root and remainder values. The value $e_0$ is also passed to each of these circuitries. The partial root negative determination circuitry 150 determines a negative portion of the partial root for a first iteration (S_neg[1]). The positive portion of the partial root for the first iteration (S_pos[1]) is 01.00. As previously discussed, the overall value of the partial root for the first iteration (S[1]) could be determined by subtracting the negative portion S_neg[1] from the positive portion S_pos[1]. The remainder positive determination circuitry 160 and the remainder negative determination circuitry 170 produce the positive and negative portions of the remainder of the first iteration respectively. Again, the value of the remainder could therefore be calculated by subtracting the negative portion rem_neg[1] from the positive portion rem_pos[1].

Figure 3:
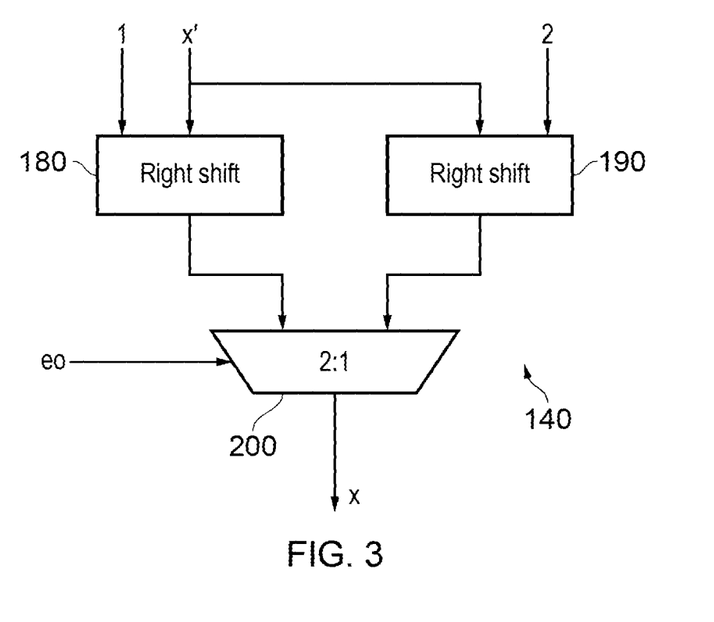
FIG. 3 illustrates an example of shifting circuitry in accordance with one embodiment.

FIG. 3 shows an example of shifting circuitry 140 in accordance with one embodiment. The shifting circuitry 140 comprises right shifting circuitry 180 and further right shifting circuitry 190. Each of the right shifting circuities 180, 190 each receives the input floating point number x', which is in normalised form (i.e. at least 1 and less than 2). In addition, the right shifting circuitry 180 also receives the input integer 1, while the further right shifting circuitry 190 also receives the input integer 2. The right shifting circuitry 180 receives the floating point number x', which is in normalised format, and performs a single right shift on the significand of x'. In this way, the significand is halved. In order to compensate, the right shifting circuitry 180 also causes the exponent to be increased by one. The resulting output significand of the right shifting circuitry 180, will therefore be at least 0.5 and less than 1. The further right shifting circuitry 190 behaves in a similar manner. However, it performs two right shifts on the significand of the input value. Similarly, the exponent will be increased by two in the case of the right shifting circuitry 190. Both of the outputs of the right shifting circuitry 180 and the further right shifting circuitry 190 are provided to 2:1 multiplexer 200. This multiplexer receives, as a switching signal, the value $e_0$. In the case of the original exponent value being odd ($e_0=1$), the output of the right shifting circuitry 180 is output by the multiplexer 200. In the event of the original exponent being even ($e_0=0$), the output of the further right shifting circuitry 190 is output by the multiplexer 200.

In performing a square-root operation, the exponent will also be divided by two. Accordingly, the shifting circuitry causes the exponent to be even before this division by two takes place so that the resulting exponent will be an integer. When the final resulting significant is produced from the output of the second recurrence circuitry 130, it will be recombined with the halved exponent to produce an output floating point number.

Having performed the above right shift(s) on what was originally a normalised significand of an input floating point number x', there are only a limited number of values that the first digit of the partial root could take after a first iteration. In particular, for a radix of four, given that rem[0]=x−1, S[0]=1. Accordingly, if the exponent was odd, then $s_1$ will be −1 if $x_0$ is 0 and 0 if $x_0$ is 1. If the exponent was even then $s_1$ will be −2 if $x_0$ is 0 and −1 if $x_0$ is 1. With these values in mind, it is then possible to determine the remainder value for each of these possible values of $s_1$.

Figure 4:
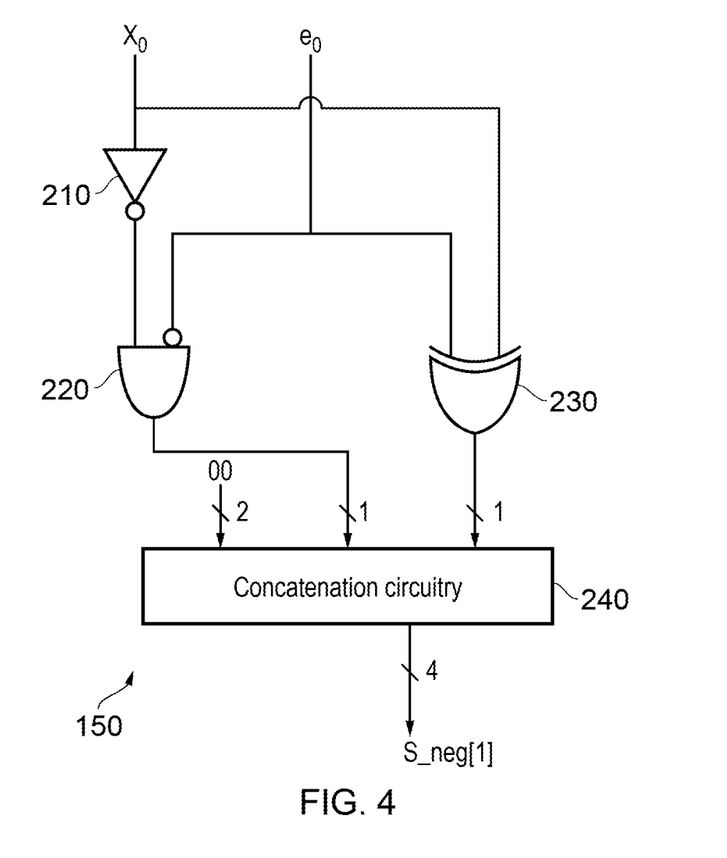
FIG. 4 illustrates an example of partial root negative determination circuitry.

FIG. 4 illustrates an example of partial root negative to termination circuitry 150 in accordance with one embodiment. The circuitry may be used in order to determine what the negative portion of the partial root would be after a first iteration had taken place (S_neg[1]) where the radix is four. The partial root negative to termination circuitry 150 receives the bit $x_0$ from the shifting circuitry 140. This bit can be obtained by simply extracting bit $x_0$ from x or x'. In any event, the bit $x_0$ represents the first bit after the decimal point of the significand of the original floating point input value x'. This bit is passed to an inverter 210, which inverts the bit and provides the result to AND gate 220. The previously discussed value $e_0$ is also provided to the AND gate 220 in inverted form, and the output of the AND gate 220 is provided to concatenation circuitry 240. Consequently, this input to the concatenation circuitry 240 will be 0 if the exponent is even, and otherwise will be the inverse of the bit $x_0$. The values of $x_0$ and $e_0$ are also each provided to the XOR gate 230. The output of the XOR gate 230 is also provided as an input to the concatenation circuitry 240. Consequently, the value that is output to the concatenation circuitry 240 is the value $x_0$ if the exponent is even, and if the exponent is odd then the value output to the concatenation circuitry 240 is the inverse of the value $x_0$. The concatenation circuitry 240 receives three inputs. Firstly, it receives the two bits "00", secondly it receives the output of the AND gate 220, and thirdly it receives the output of the XOR gate 230. These four bits are then concatenated in that order, and the resulting output is S_neg[1].

Figure 5:
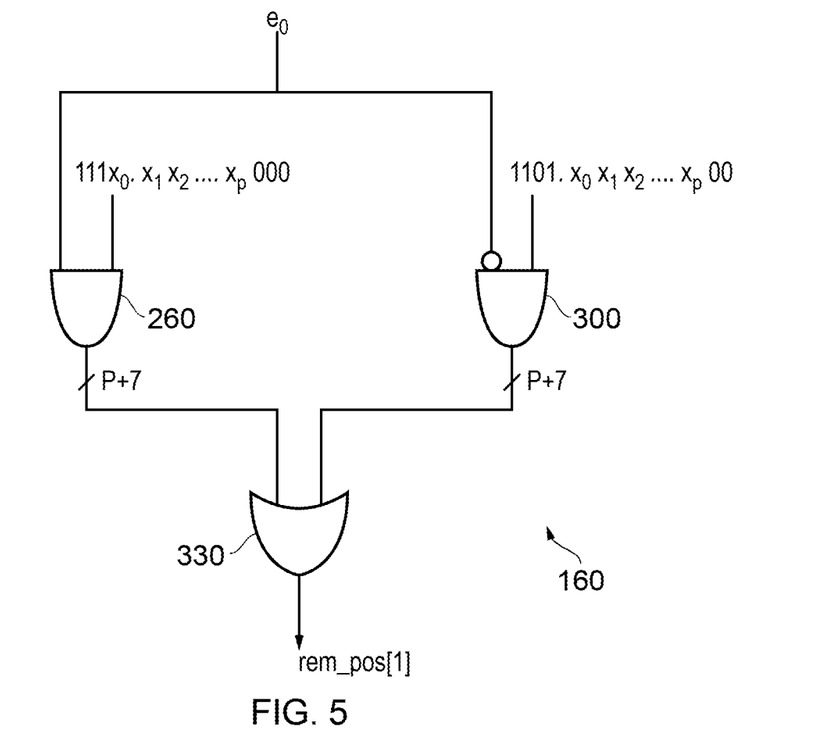
FIG. 5 illustrates an example of remainder positive determination circuitry in accordance with one embodiment.

FIG. 5 illustrates an example embodiment of remainder positive determination circuitry 160. This circuitry may be used to provide the positive portion of the remainder after one iteration in redundant-representation (rem_pos[1]) where the radix is four. This occurs without the first iteration of the square-root algorithm actually being performed. The remainder positive determination circuitry 160 comprises two AND gates 260, 300, which each receive $e_0$ and one of the two values: $1101.x_0x_1x_2 \ldots x_p00$ and $111x_0.x_1x_2 \ldots x_p000$. The output of the AND gates 260, 300 is provided to OR gate 330. The output of the OR gate 330 corresponds with rem_pos[1], the positive portion of the remainder after one iteration. In effect, the remainder positive determination circuitry 160 selects one of the two numbers $1101.x_0x_1x_2 \ldots x_p00$ and $111x_0.x_1x_2 \ldots x_p000$ in dependence on the value of $e_0$.

Figure 6:
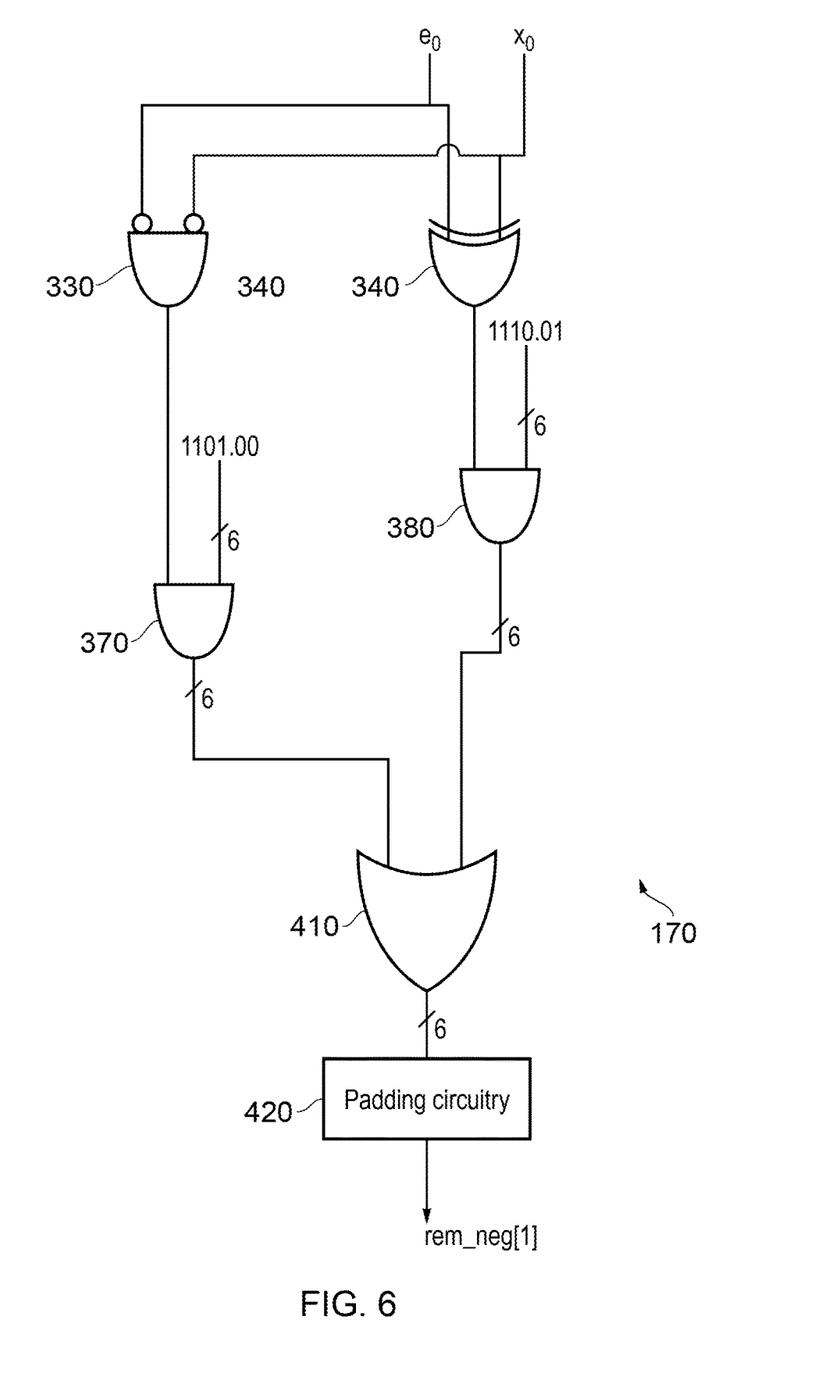
FIG. 6 illustrates an example of remainder negative determination circuitry.

FIG. 6 illustrates an example of remainder negative determination circuitry 170 where the radix is four. The remainder negative determination circuitry 160 comprises an AND gate 330, which receives inverted $e_0$ and inverted $x_0$, and XOR gate 340, which receives $e_0$ and $x_0$. The AND gate 330 and the XOR gate 340 are then each associated with a further AND gate 370, 380. Each of these further associated AND gates receives, as an input, the output value of its associated gate. The further AND gate 370 associated with the AND gate 330 that receives inverted $e_0$ and inverted $x_0$ also receives the number 1101.00 as an input. The further AND gate 380 that is associated with the XOR gate 340 that receives $e_0$ and $x_0$ also receives the number 1110.01 as an input. The output of these further associated AND gates 370, 380 is provided to OR gate 410. The output of the OR gate 410 is provided to padding circuitry 420. The padding circuitry pads the output by adding least significant bits of 0 to the output to have its full length. The result is rem_neg[1].

Figure 7:
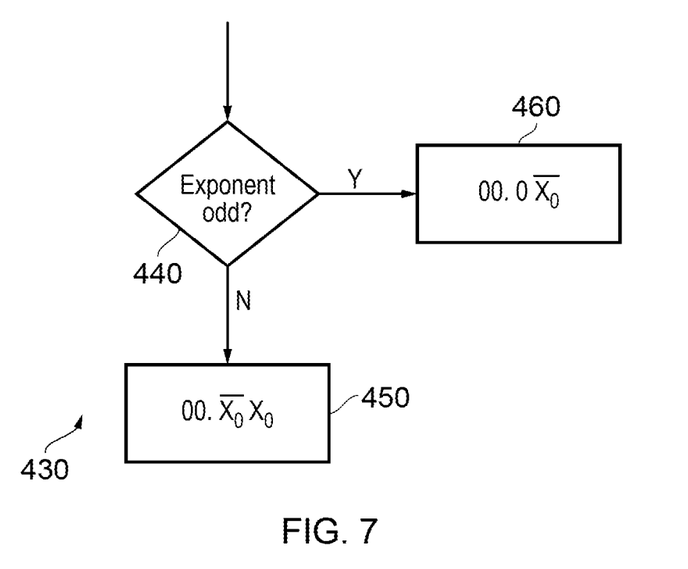
FIG. 7 illustrates a flowchart showing a method for determining the partial root after a first iteration.

FIG. 7 illustrates a flowchart 430 for determining what the negative portion of the partial root would be after one iteration (S_neg[1]) where the radix is four. If, at step 440, it is determined that the exponent is odd, then at step 460 the value of the negative portion of the partial root is output as $00.0\overline{x_0}$, otherwise, at step 450 the value of the negative portion of the partial root is output as $00.\overline{x_0}x_0$.

Figure 8:
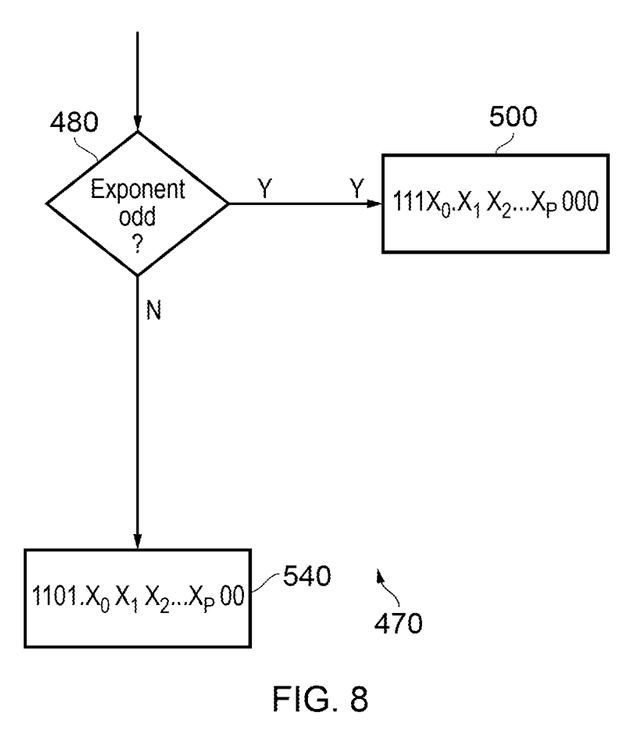
FIG. 8 illustrates a flowchart showing a method for determining the positive portion of the remainder in redundant-representation in accordance with one embodiment.

FIG. 8 illustrates a flowchart 470 for determining would the positive portion of the remainder value would be after one iteration (rem_pos[1]) where the radix is four. At a step 480, it is determined whether or not the exponent is odd. If so, at step 500, the output value is $111x_0.x_1x_2 \ldots x_p000$. If, at step 480, it is determined that the exponent is not odd (i.e. it is even), then at step 540, the value is determined to be $1101.x_0x_1x_2 \ldots x_p00$.

Figure 9:
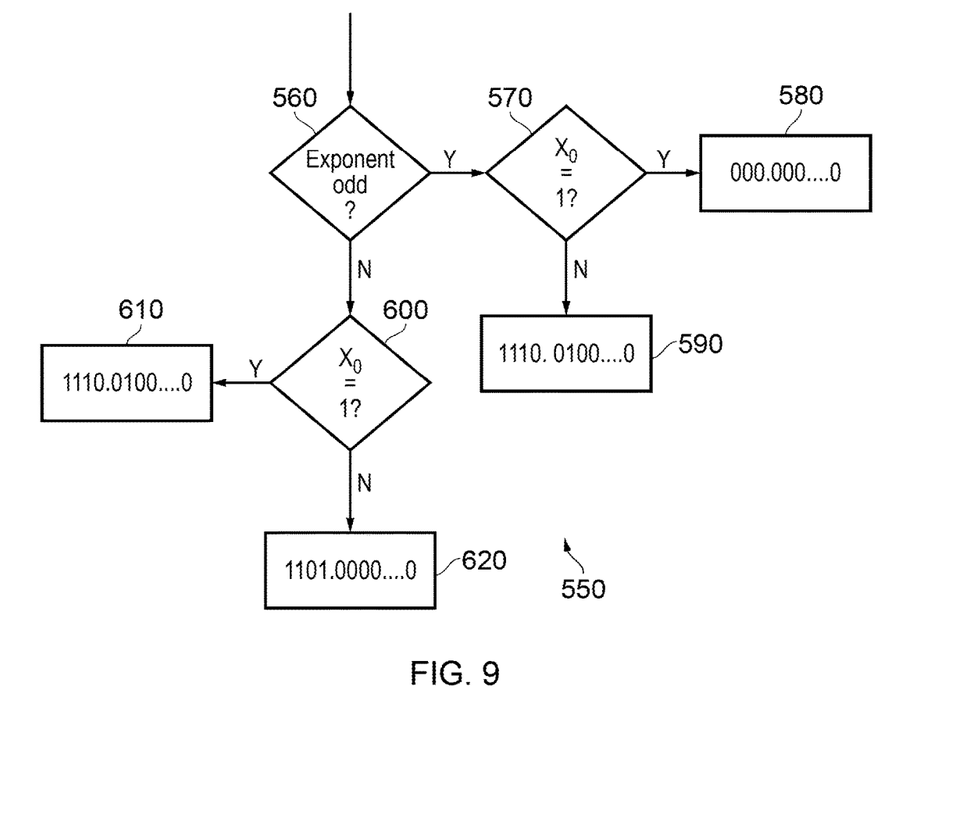
FIG. 9 illustrates a flowchart showing a method for determining a negative portion of the remainder in redundant-representation format.

FIG. 9 illustrates a flowchart 550 for determining what the negative portion of the remainder value would be after one iteration (rem_neg[1]) four a radix of four. The process begins at step 560, where it is determined whether the exponent is odd or not. If so, then at step 570, it is determined whether the bit $x_0$ is equal to one. If so, then at step 580, the value of rem_neg [1] is determined to be 000.000 . . . 0. Otherwise, at step 590, the value of rem_neg [1] is determined to be 1110.0100 . . . 0. If, at step 560, the exponent is not odd (i.e. the exponent is even), then at step 600 it is determined whether the bit $x_0$ is equal to one. If so, then at step 610, the value of rem_neg[1] is determined to be 1110.0100 . . . 0. Otherwise, the value of rem_neg[1] is determined, at step 620, to be the value 1101.0000 . . . 0.

The above circuitry is therefore able to more efficiently produce output values (an at least partial root and a remainder) in respect of at least a first iteration of a square root digit-recurrence algorithm without performing the full set of calculations in respect of the at least first iteration of the algorithm. In the above embodiments, it has been assumed that the radix used by the circuitry is four. However, other values of the radix also work. In the case of a radix of two, each digit is composed by a pair of bits and it is possible to "skip" the first two iterations rather than the first one as is the case when the radix is four. In particular, the digit determination function DET (also referred to as SEL) for a radix of two is independent of the partial root and is:

$$s_{i+1} = \begin{cases} 1 & \text{if } 0 \leq \widehat{rem}[i] \leq 3 \\ 0 & \text{if } \widehat{rem}[i] = -1 \\ -1 & \text{if } 0 \leq \widehat{rem}[i] \leq 3 \end{cases}$$

Only the integer part of the remainder estimate is used to select the next digit of the partial root. Given that the root must be at least 0.5 and less than 1, the first digit of the partial root, $s_1=1$.

Given the initial values rem[0]=x, $s_0$=0, and S[0]=0 and using the equations for $s_{i+1}$, S[i+1] and rem[i+1], the remainder after one iteration can be determined as rem[1]=2x−0.5 and S[1]=0.1. Therefore, in redundant representation:

rem_pos[1]=2x rem_neg[1]=0.100 . . . 0

For the second iteration, the values of rem_pos and rem_neg depend on whether the exponent is odd or even.

If the exponent is odd, then $x=0.1x_0x_1x_2 \ldots x_p0$ (after x' has been shifted as previously discussed). From the above, 2 rem[1]=2(2x−0.5)=4x−1=$00x_0\overline{x_0}.x_1x_2 \ldots x_p000$. $2\widehat{rem}[1]=00x_0\overline{x_0}$. Therefore:

$s_2$=1

S[2]=0.11 rem[2]=4x−1−(2S[1]+$2^{-2}$)

rem_pos[2]=4x=$001x_0.x_1 \ldots x_p000$ rem_neg[2]=1+(1+0.25)=0010.010 . . . 0

If the exponent is even, then $x=0.01x_0x_1x_2 \ldots x_p$ (again, after x' has been shifted as previously discussed). From the above, $2\text{rem}[1]=4x-1=0000.x_0\bar{x}.x_1x_2 \ldots x_p000$. $\overline{2\text{rem}}[1]=0000$. Therefore:

$$s_2=0$$

$$S[2]=0.10$$

$$\text{rem}[2]=4x-1$$

$$\text{rem\_pos}[2]=4x=0001.x_0x_1\ldots x_p000$$

$$\text{rem\_neg}[2]=0001.000\ldots 0$$

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus to calculate an at least partial square root of a floating point number comprising an exponent and significand, said data processing apparatus comprising:
   recurrence circuitry to perform one or more iterations of an iterative square root operation, some of said one or more iterations receiving an input at least partial square root and an input remainder to produce said at least partial square root and a remainder of performing said iterative square root operation, wherein
   said recurrence circuitry is configured to provide said at least partial square root and said remainder as said input at least partial square root and said input remainder for a subsequent iteration of said iterative square root operation;
   said recurrence circuitry comprises initialisation circuitry to provide said at least partial square root and said remainder after at least an initial iteration of said one or more iterations; and
   said initialisation circuitry is configured to produce said remainder by performing a selection of at least one of a plurality of predetermined values in dependence on whether said exponent is odd or even.

2. The data processing apparatus according to claim 1, wherein
   said remainder is represented using redundant-representation comprising a positive word and a negative word;
   said plurality of predetermined values are a plurality of possible predetermined values of said negative word.

3. The data processing apparatus according to claim 2, wherein
   said initialisation circuitry is configured to produce said positive word by performing a concatenation on bits '11', followed by bits of said floating point number, followed by bits '00'.

4. The data processing apparatus according to claim 2, wherein
   said initialisation circuitry is configured to produce said positive word by performing a further selection of one of a plurality of predetermined values of said positive word in dependence on a value of said bit of said significand.

5. The data processing apparatus according to claim 4, wherein
   said further selection is additionally in dependence on whether said exponent is odd or even.

6. The data processing apparatus according to claim 1, wherein
   said selection is additionally in dependence on a value of a bit of said significand.

7. The data processing apparatus according to claim 6, wherein
   said initialisation circuitry is configured to produce said at least partial square root in dependence on whether said exponent is odd or even, and in dependence on said value of said bit of said significand.

8. The data processing apparatus according to claim 7, wherein
   said at least partial square root is represented using redundant representation comprising a positive word and a negative word;
   said positive word is '01.00'; and
   in response to said exponent being odd, said negative word comprises bits '00.0' followed by a negation of said bit of said significand; and
   in response to said exponent being even, said negative word comprises bits '00', followed by a decimal point, followed by a negation of said bit of said significand, followed by said bit of said significand.

9. The data processing apparatus according to claim 1, wherein said initialisation circuitry comprises shifting circuitry to right shift said significand a number of times and to increment said exponent by said number of times, wherein
   in response to said exponent being even, said number of times is two; and
   in response to said exponent being odd, said number of times is one.

10. The data processing apparatus according to claim 1, wherein
    said recurrence circuitry provides said at least partial square root by passing said at least partial square root to said recurrence circuitry.

11. The data processing apparatus according to claim 10, wherein
    in each of said one or more iterations, said at least partial square root increases in length by one digit.

12. The data processing apparatus according to claim 1, wherein
    said at least partial square root has a radix of 4.

13. The data processing apparatus according to claim 1, wherein
    said at least partial square root has a radix of 2.

14. The data processing apparatus according to claim 1, wherein
    said bit of said significand is a first bit of said significand.

15. A data processing means for calculating an at least partial square root of a floating point number comprising an exponent and significand, said data processing means comprising:
- means for performing one or more iterations of an iterative square root operation, some of said one or more iterations receiving an input at least partial square root and an input remainder to produce said at least partial square root and a remainder of performing said iterative square root operation, wherein
- said means for performing is for providing said at least partial square root and said remainder as said input at least partial square root and said input remainder for a subsequent iteration of said iterative square root operation;
- said means for performing comprises means for providing said at least partial square root and said remainder after at least an initial iteration of said one or more iterations; and
- said means for providing is for producing said remainder by performing a selection of at least one of a plurality of predetermined values in dependence on whether said exponent is odd or even.

16. A data processing method of calculating an at least partial square root of a floating point number comprising an exponent and significand, said data processing method implemented by a data processing apparatus comprising:
- performing, using recurrence circuitry, one or more iterations of an iterative square root operation, some of said one or more iterations receiving an input at least partial square root and an input remainder to produce said at least partial square root and a remainder of performing said iterative square root operation, wherein
- said at least partial square root and said remainder are passed, using recurrence circuitry, as said input at least partial square root and said input remainder for a subsequent iteration of said iterative square root operation;
- said step of performing one or more iterations comprises an initialisation step of providing, by initialisation circuitry, said at least partial square root and said remainder after at least an initial iteration of said one or more iterations; and
- said initialisation step produces, by initialisation circuitry, said remainder by performing a selection of at least one of a plurality of predetermined values in dependence on whether said exponent is odd or even.

* * * * *